United States Patent [19]

Richardson et al.

[11] Patent Number: 4,958,706
[45] Date of Patent: Sep. 25, 1990

[54] ADJUSTABLE SHOCK ABSORBERS

[76] Inventors: Donald G. Richardson, 16515 Stamp Mill Loop, Jamestown, Calif. 95327; John G. Cazort, 1902 Clay St., Newport, Calif. 92663

[21] Appl. No.: 270,010

[22] Filed: Nov. 14, 1988

[51] Int. Cl.⁵ .............................................. F16F 9/34
[52] U.S. Cl. .................................. 188/319; 188/277; 188/285
[58] Field of Search ............... 288/299, 276, 277, 314, 288/319, 288, 289, 285, 282, 278

[56] References Cited

U.S. PATENT DOCUMENTS

| | | | |
|---|---|---|---|
| 2,664,859 | 1/1954 | Green | 188/314 |
| 2,909,248 | 10/1959 | Geis | 188/277 |
| 3,532,195 | 10/1978 | Miller | 188/277 |
| 4,010,829 | 3/1977 | Naito et al. | 188/314 |
| 4,337,850 | 7/1982 | Shimokura | 188/319 |
| 4,476,967 | 10/1984 | Tetsuo | 188/319 |

Primary Examiner—Andres Kashnikow
Assistant Examiner—Matthew C. Graham
Attorney, Agent, or Firm—Wagner & Middlebrook

[57] ABSTRACT

An adjustable shock absorber includes a valve in the piston which has a flow path. The valve can be adjusted both rotationally and longitudinally to alter different characteristics of the flow path.

21 Claims, 7 Drawing Sheets

FIG. 6
SLOW SPEED

FIG. 7
HIGH SPEED

ADJUSTABLE SHOCK ABSORBERS

BACKGROUND OF THE INVENTION

For many years it has been recognized that one of the most critical elements of any vehicle suspension system is the shock absorber or damper which is coupled to the suspension system for the purpose of bringing a suspension system into equilibrium after deflection or extension responsive to road conditions or a maneuver by the vehicle. This is true whether the vehicle be a motorcycle, an off road vehicle, a conventional or performance vehicle or a racing automobile. The importance of the shock absorber is particularly recognized in the racing field where each race car has its own weight, distribution of that weight, power plant and handling characteristics. During the development of a race car, these may change and it would be desirable to change and experiment with the shock absorber characteristics to achieve optimum performance of the race car with each change in its design. It is further desirable for the race car to adjust it suspension system for different tracks or different conditions on each track. The difference between winning and a mediocre performance can often be traced to the shock absorbers.

Heretofore, shock absorbers have been made adjustable or changeable. The adjustments are typically of the compression and extension damping rates. Many of those require a partial disassembly of the shock absorber and a substitution of different elements such as orifices or internal adjustments. More recently, adjustable shock absorbers have been developed with exterior adjustments for both compression and rebound. Examples of such disclosures are found in the following United States Patents:

| U.S. Pat. No. | INVENTOR | DATE |
| --- | --- | --- |
| 3,256,960 | M. Casimir | June 21, 1966 |
| 3,351,160 | de Koning et al | Nov. 7, 1974 |
| 3,848,710 | J. T. Thompson | Nov. 19, 1974 |
| 3,960,251 | A. J. Gorissen | June 1, 1976 |
| 4,036,335 | Thompson et al | July 19, 1977 |
| 4,298,102 | Nishikawa et al | Nov. 3, 1981 |
| 4,305,486 | A. A. Cowan | Dec. 15, 1981 |
| 4,535,877 | A. Shimokura | Aug. 20, 1985 |
| 4,546,959 | S. Tanno | Oct. 15, 1985 |
| 4,635,906 | S. Buma | Jan. 13, 1987 |
| 4,741,416 | F. Tanigawa | May 3, 1988 |
| 4,744,444 | C. L. Gillingham | May 17, 1988 | and the following foreign patents:

| COUNTRY | NUMBER | DATE |
| --- | --- | --- |
| France | 2,418,390 | Sept. 21, 1979 |

Further refinements of adjustable shock absorbers include those which are digitally or computer controlled and electrically operated such as the shock absorber disclosed in United States Patents:

| 4,596,320 | Shimokura et al | June 24, 1986 |
| 4,664,409 | Nakashima et al | May 12, 1987 |

Another critical factor in the design and operation of shock absorbers lies in the need for temperature compensation to avoid any dramatic or unpredictable change in characteristics resulting not from intentional adjustment or change in road conditions but due to temperature changes. These changes include ambient temperature change from early morning to the heat of the day, shock absorber temperature change from operation, change in viscosity of the oil medium contained within the shock absorber, change in density of the gas medium, change in dimensions of component parts of the shock absorber to name the most significant temperature changes. The results of such changes in temperature must be recognized in the design phase of the development of a shock absorber and must be counteracted by temperature sensitive elements within the shock absorber to compensate and hopefully eliminate any net change in operating characteristics of the shock absorber due to any of the foregoing uncontrollable temperature changes. Various attempts have been made in the past to provide temperature compensation in shock absorbers. These are disclosed in the following United states patents:

| 3,088,555 | W. A. Karlgaard | May 7, 1963 |
| --- | --- | --- |
| 3,944,197 | A. Dachicourt | Mar. 16, 1976 |

Despite the development of shock absorbers over the many years, a number of problems continue to plague the field. They include:
1. Adjusting mechanisms tend to be complex and unreliable.
2. The multiple adjusting mechanisms seldom, if ever, provide independence of each of the adjustments.
3. Few of the adjustment mechanisms allow rapid adjustment without tools.
4. High speed and low speed independent adjustments have not been achieved.
5. Dual temperature compensation, one reflecting and compensating for the temperature change effect upon compression damping rate and a second one for rebound rate temperature effects have been lacking.

BRIEF DESCRIPTION OF THE INVENTION

Faced with the continuing need for truly independent manual external adjustable shock absorbers which are truly temperature compensated, we have developed in the preferred embodiment, a shock absorber which employs two rebound adjustments, both operable externally from the same end and both having simple thumbwheel or hex wrench adjustments for both high speed (300psi or greater) or low speed (100psi or less) rebound rate. The two rebound rate adjustments provide significantly different rebound characteristics over the two different rate ranges and cooperate to provide a truly optimized family of curves for the rebound characteristics of the shock absorber. The compression characteristics of the shock absorber are both adjustable and compensatable by a separate manual adjustment, preferably found in a separate reservoir. The compression and rebound adjustments are truly independent in effect upon the other rate characteristic. The temperature compensation of the compression adjustment system and the rebound rate adjustment systems are automatic and independent of each other. The rate adjustments may be made without special tools. Both rebound adjustments operate upon a single rod which is coaxially aligned within a hollow piston rod. One of the thumbwheel or hex wrench adjustments rotates the rod to adjust the high speed rebound characteristics of the shock absorber. Rotation of the second thumbwheel linearly advances or retracts the rod without rotating it and makes an adjustment in the low speed rebound rate characteristic of the shock absorber. The separate adjustment in the reservoir adjusts the compression rate characteristic of the shock absorber. A representative form of this embodiment of this invention comprises a shock absorber body in the form of a hollow tube which is closed at one end by an end fitting which includes a bearing end for receiving a bushing for connection to the vehicle and a side port for communicating with a separate reservoir. The body of the shock absorber defines a cylinder in which a piston moves along with its piston rod. The piston rod includes a rod end fitting and bushing for connection to the second connection to the vehicle. One bushing connects to the vehicle frame and the other to a moving portion of the suspension. Often the body is surrounded by the spring for which it acts as the damper.

The piston rod is in fact a tube which surrounds the adjusting rod of this invention. The rod is mounted for both rotation and for axial movement within the piston rod or, more precisely, piston tube. The outer end of the adjusting rod joins the rod end and into engagement with two adjustment mechanisms, both in the form of thumbwheels or in one embodiment, with hex wrench movable collars. The thumbwheels or collars are mounted for rotational movement within the rod end about the longitudinal axis of the adjustment rod. One thumbwheel or collar, the inboard or first thumbwheel or collar is in threaded engagement with the tubular piston rod whereby rotation of this first thumbwheel produces relative axial movement of the adjusting rod with respect to the tubular piston rod without rotation of the adjustment rod. Such movement varies the size of slow speed rebound characteristics of the shock absorber.

The second or outboard thumbwheel or collar engages the adjustment rod as by a sliding keyed engagement whereby the adjustment rod may move axially independent of the second thumbwheel position but is restrained from rotation by their keyed relationship. However rotation of the second thumbwheel or collar produces rotation of the adjustment rod without axial movement. Rotational movement of the second thumbwheel adjusts the high speed rebound characteristics of the shock absorber. The second thumbwheel or collar, when set, prevents unintended rotational movement of the adjustment rod.

At the inner end of the adjustment rod in the piston of the shock absorber are two adjustable flow restrictions, one in the form of a sliding valve in which the adjustment of the first thumbwheel limits the travel of the sliding valve.

The second thumbwheel producing linear or axial movement of the adjusting rod results in increasing or decreasing the preload on the sliding (pressure relief) valve on rebound.

In the compression stroke, a low compression flow resistance check valve is present in the form of a first series of orifices or ports are arranged in a circle in the piston surrounding the piston rod. A washer shaped check valve is spring loaded to close the multiple ports during extension and to open during compression. The ports end on the side of the piston opposite to its rod in an annular groove which forms a small manifold.

In an alternate embodiment of this invention, the two thumbwheel adjustments remain, however the first or inboard adjustment through linear displacement of the adjusting rod in the tubular piston rod, adjusts the compression rate of the shock absorber. The second or outboard thumbwheel through rotational adjustment of the adjusting rod, adjusts the rebound characteristics (either high speed or low speed) of the shock absorber.

In a further alternate embodiment of this invention, rebound is adjusted by linear displacement of the adjusting rod rather than rotational and compression rate is adjusted through rotation rather tan linear displacement of the adjusting rod.

In neither of these alternate embodiments is a reservoir used or required and instead an internal precharged gas bladder or a free movable piston used to provide a variable volume for the shock absorber fluid.

BRIEF DESCRIPTION OF DRAWING

This invention may be more easily understood from the following detailed description and by reference to the drawing, in which.

DETAILED DESCRIPTION OF INVENTION

Figure 1:
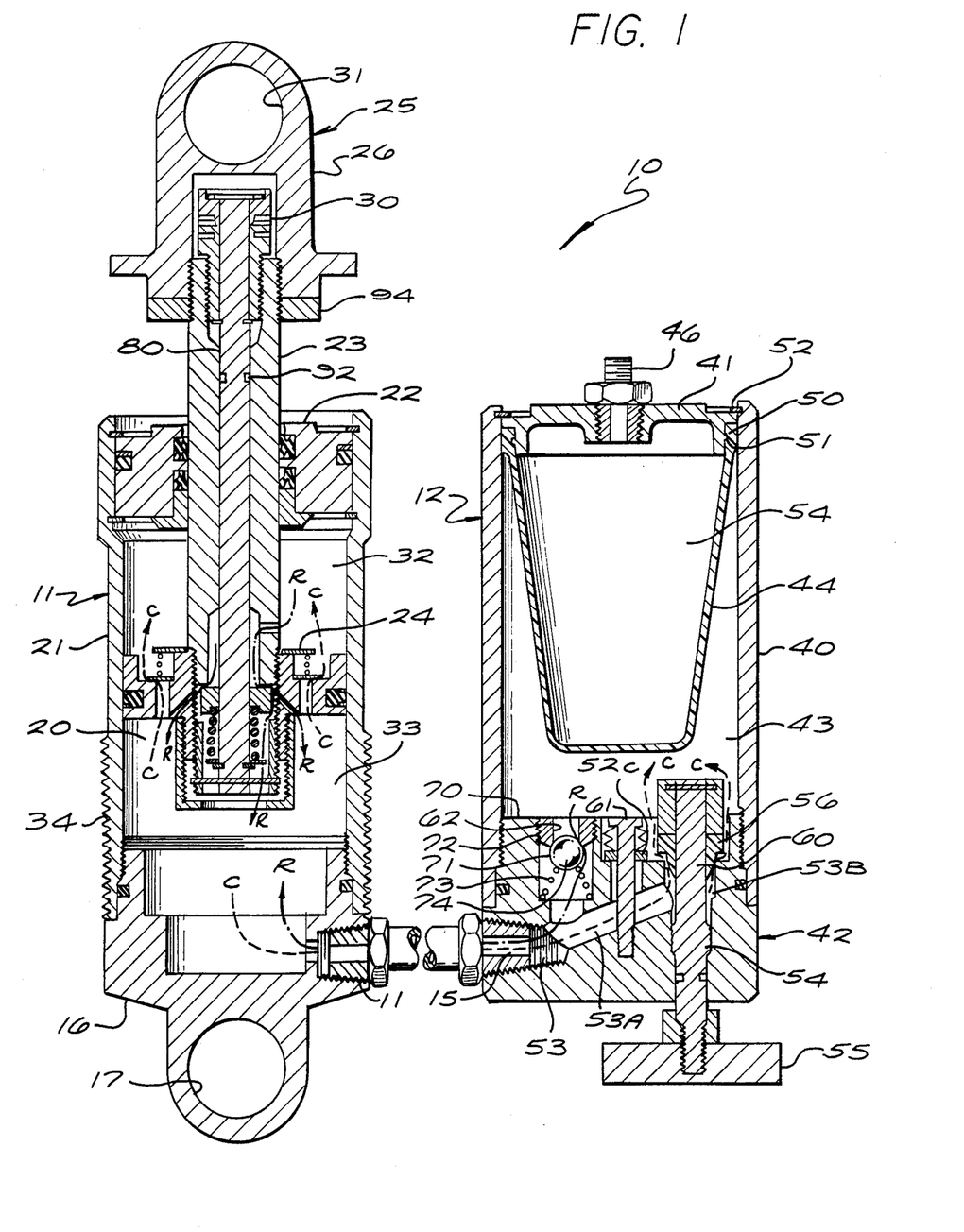
FIG. 1 is a vertical axial sectional view of a shock absorber and reservoir incorporating this invention.
Figure 1A:
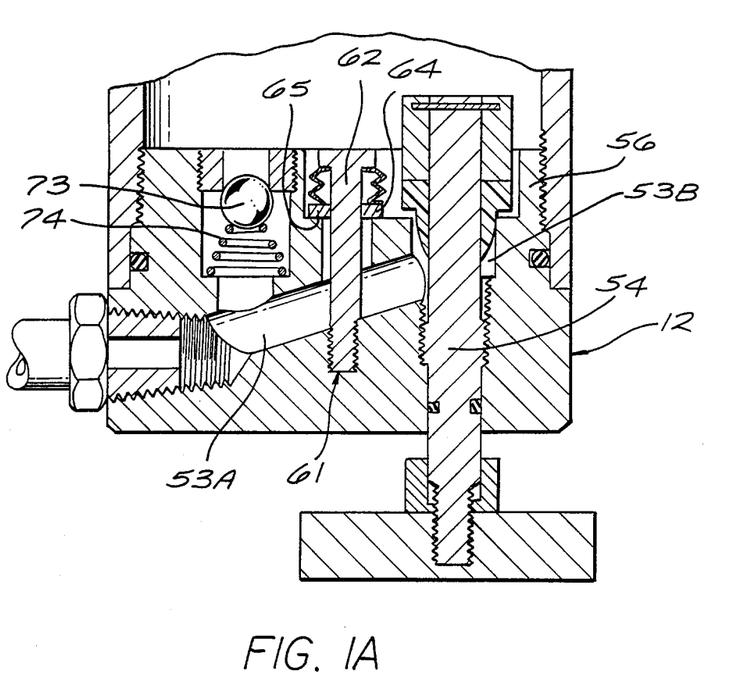
FIG. 1A is an enlarged fragmentary sectional view of the reservoir of FIG. 1.
Figure 1B:
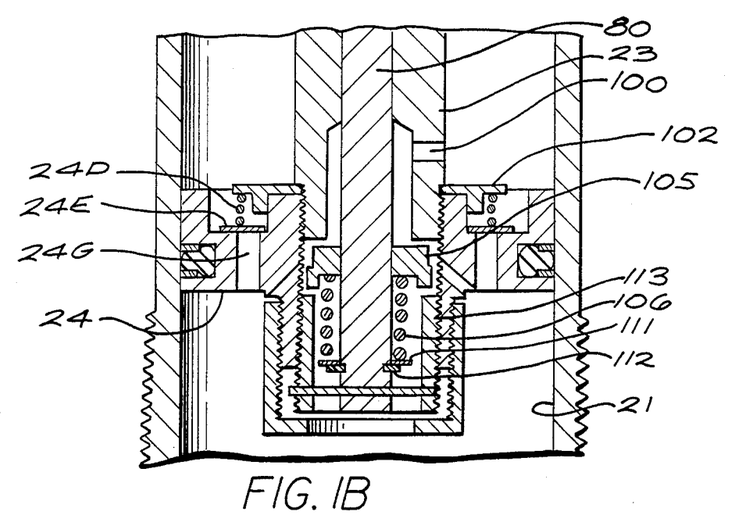
FIG. 1B is an enlarged fragmentary sectional view of the rebound adjustment valves of FIG. 1.
Figure 2:
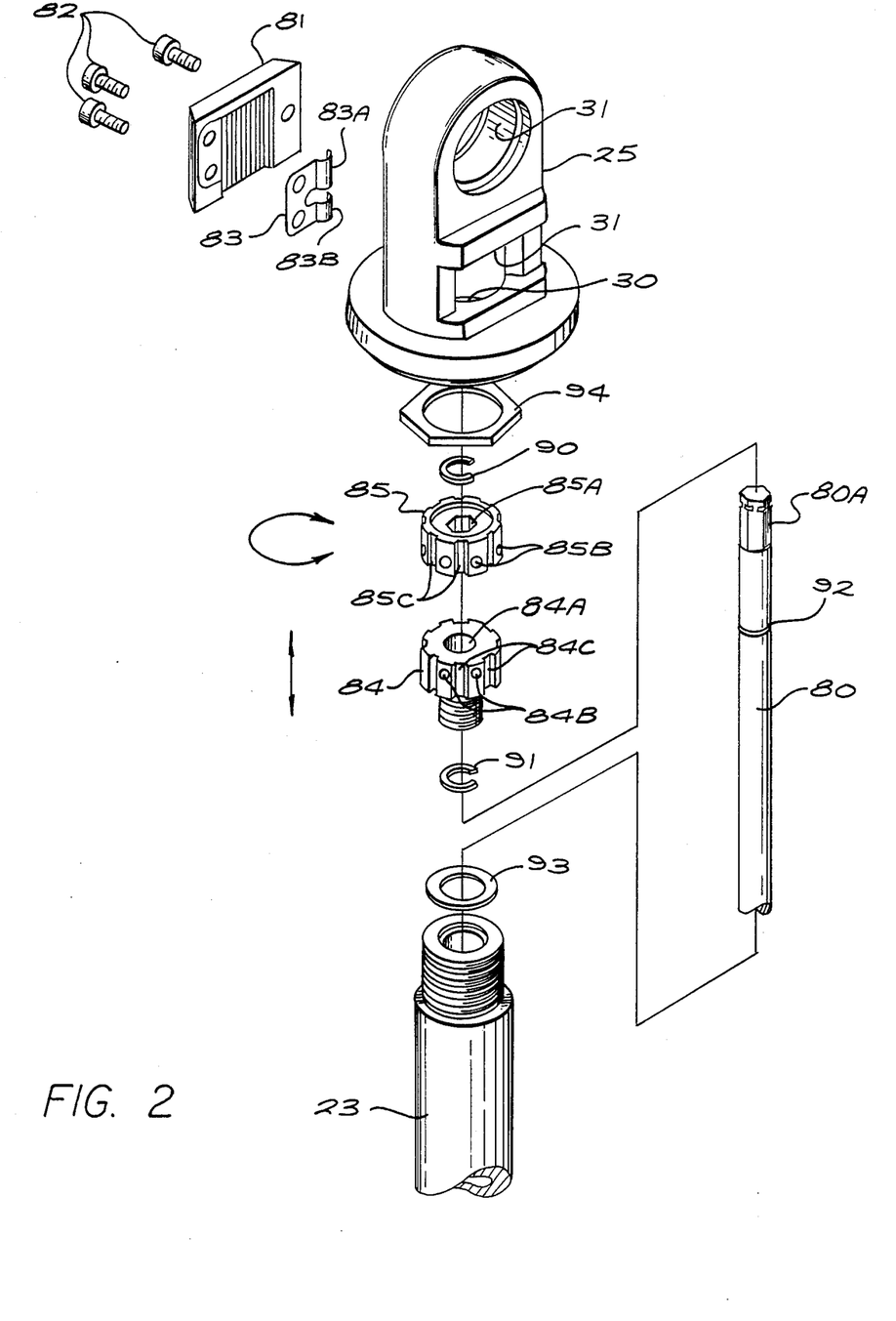
FIG. 2 is an exploded view of the external adjustment detail and upper end of the piston rod of the shock absorber of FIG. 1.
Figure 3:
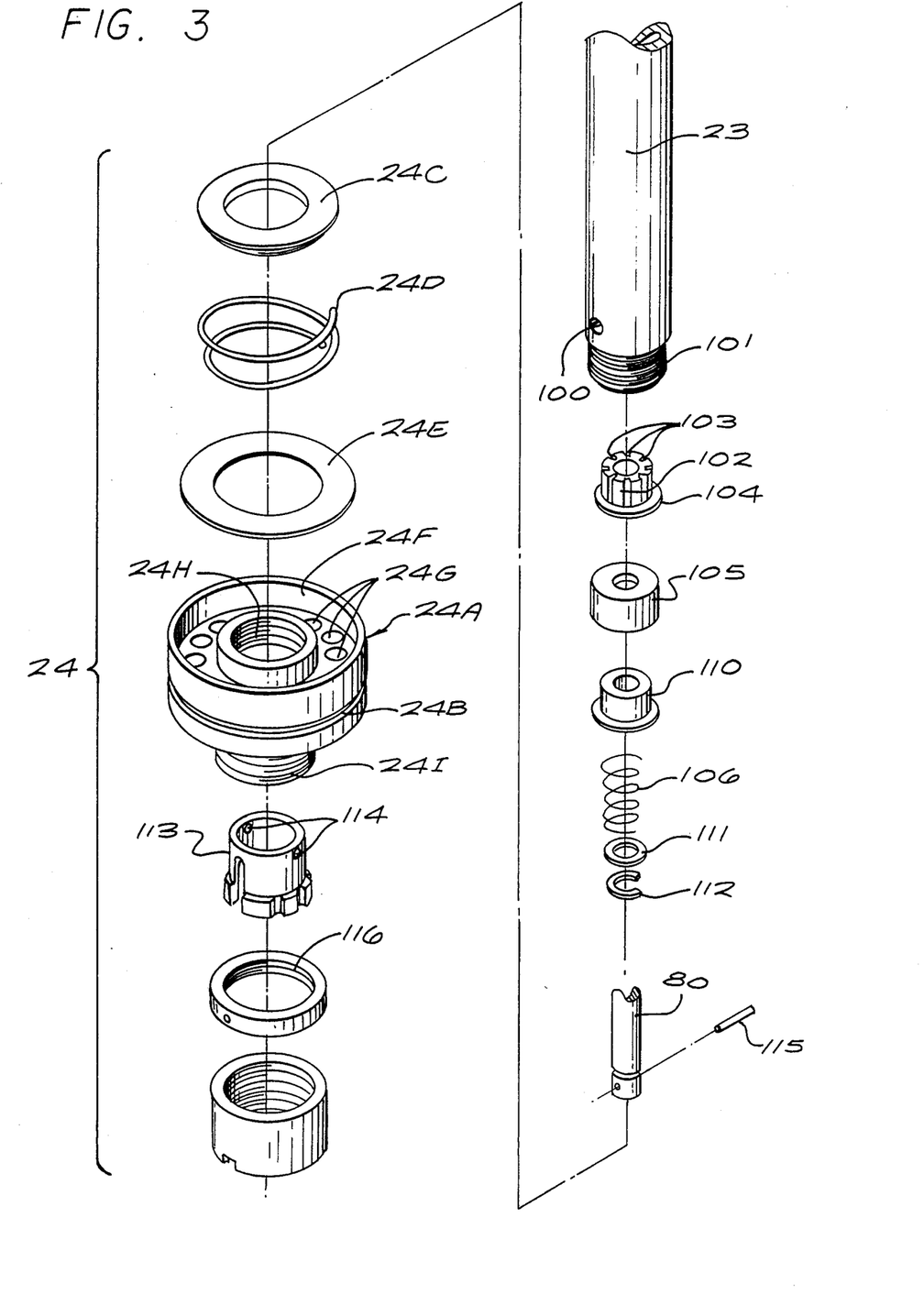
FIG. 3 is an exploded view of the piston assembly and piston end of the piston rod of the shock absorber of FIG. 1.

Now referring to FIG. 1, 1A, 1B in connection with FIGS. 2 and 3, a shock absorber assembly, generally designated 10 is shown including a shock absorber 11 and a separate reservoir 12 with interconnecting pressure hose 13 with end fittings 14 and 15 for mating with the shock absorber 11 and reservoir 12, respectively. The shock absorber 11 includes an end cap and mount 16 which seals one end of a cylinder 20 formed by the shock absorber body 21 and the end cap 16 as well as a rod end seal assembly 22. Extending into cylinder 20 through the rod end seal 22 is a piston rod 23 carrying at its inner end a piston assembly 24. The body 21, cylinder 20 and piston assembly 24 are circular and FIG. 1 is a longitudinal axial or diametrical sectional view.

The outer end of the piston rod 23 ends in rod end assembly 25 which carries an end boss 26 which includes an axial recess 30 for receiving the end of the rod 23 as well as a transverse opening 31 for receiving a bushing for mounting the rod end of the shock absorber on the vehicle in a conventional manner. The end cap 16 also includes a similar transverse opening 17 for securing the cylinder end of the shock absorber 11 to the vehicle. In the position shown in FIG. 1, the end cap 16 would typically be secured by a bushing, unshown, passing through opening 17 to the vehicle frame. The rod end 25 would typically be secured by a bushing, unshown, passing through transverse opening 31 and secures to a moving portion of the suspension of the vehicle. The shock absorber assembly 10 may be mounted and operated inverted from the position shown in the drawing, FIG. 1.

Within the body 21, two chambers are formed on opposite sides of the piston assembly 24, a first chamber 32 between the rod end seal assembly 22 and the piston assembly 24 and a second chamber 33 within the cylinder 20 between the end cap 16 and the opposite face of the piston assembly 24. Exterior threads 34 on the body 21 are used to engage a threaded stop, unshown in the drawing when the shock absorber 11 is used in a coil-over-shock configuration as is common in the industry.

The reservoir 12 includes a body 40 with an optionally separate end seal 41 as well as a flow control end assembly 42. The interior of the body 40, the end seal 41 and the flow control end assembly 42 define a chamber 43 containing a flexible bladder 44 of synthetic rubber or the like which is impervious to the shock absorber fluids used. The bladder 44 is preferably frusto-conical in shape as shown in the drawing, FIG. 1 but its shape is not critical. Bladder 44 forms an air chamber 45 with the end seal assembly 41 within the chamber 43. Air or nitrogen pressure, for example at 120-200 psi is introduced into the chamber 45 via Shrader valve fitting 46 with its internal check valve, unshown, and exposed to the outer wall of the end seal 41. The end seal 41, as indicated above, may be formed integrally with the reservoir body 40 or as in this case is a separate member in the form of an internally fitting end cap with an annular bead 50 which engages and seals against a mating groove 51 in the inner surface of the bladder 44. End seal 41 is, in the embodiment of FIG. 1, secured to the reservoir body 40 by a circlip 52 or other similar fastener in the inner chamber wall of the body 40.

The reservoir 12 provides for storage of fluid from the shock absorber during the compression stroke of the shock absorber 11, return of the fluid to the shock absorber, second chamber during rebound, flow control of the compression stroke and one of the forms of temperature compensation of this invention.

The reservoir 12 includes an inlet-outlet port 53 into which end fitting 15 of the hose 13 is threaded and sealed. The port 53 includes transverse passage 53A which communicates with longitudinal passage 53B surrounding an adjusting screw 54 with its external handle 55 controls flow from the second chamber 33 of the shock absorber 11 into the chamber 43. The seal of adjusting screw 53 is an annular washer 56 which controls the size of an annular passage 60 formed in the assembly 42. The seal 56 is preferably formed of a thermally expandable plastic material which expands significantly in dimensions upon an increase in temperature from about 25 degrees C. to a working temperature of the shock absorber 10 as high as 500 degrees F. Regardless of the setting of the screw 54 by the handle 55, as the temperature of the shock absorber fluid rises, the expansion of washer 56 pushes hollow needle 60 to restrict the size of the annular passage 56 and increases the resistance to compression stroke fluid flow. The hollow needle 60 may be of metal such as stainless steel and backed by a thermally expansive washer 56 or may be fabricated totally of thermally expansive material such as Torlon, identified more completely below. The expansion of the hollow needle 60 as the shock absorber heats up tends to compensate for the expansion of parts of this shock absorber 11 and reservoir 12 and of the change in viscosity of the shock absorber fluid contained in the chambers 32, 33 and 43 with increases in temperature.

We have found that the material sold under the trademark TORLON Type 4203 of the E.I. du Pont company of. Wilmington, Del. is eminently successful in this invention for the hollow needle 60 or washer 56. In one embodiment, thermally expansive material is washer 56 with an outside diameter of $\frac{5}{8}$ inch, an inside diameter of $\frac{1}{4}$ inch and a thickness of $\frac{1}{4}$ inch. With a change of temperature in the order of 300 degrees from start to extreme operating conditions, the needle 60 or washer 56 increases in thickness sufficiently to provide effective temperature compensation over the entire operating temperature range. The Torlon washer material exhibits a coefficient of thermal expansion of $17 \times 10^{-6}$ in./in./degree F.

An over pressure or internal relief valve 61 is also contained in the reservoir 12 in the form of a T headed rod or screw 61 in a passage 53C holding a spring 63 and a seal 64 against a seat 65. The over pressure valve 61 is designed to relieve pressure in passage 53A at a pressure above 2000 psi.

The reservoir 12 also includes in the assembly 42, a check valve 70 including recess 71, threaded retainer 72, ball 73 and spring 74. The spring 74 is selected to allow flow from the reservoir chamber 43 to port 53A when the pressure in the passage 53 falls to 3 psi below that of the air bladder reservoir 45. The passage 53D is relatively large to allow little restriction on the flow of fluid from the reservoir 12 to the shock absorber 11 chamber 33 at the end of each compression stroke.

Referring now specifically to FIGS. 1A, 1B, 2 and 3 in connection with FIG. 1 will allow an understanding of the components and operation of the shock absorber 11. In FIG. 2 the rod end 25 may be seen at the top with the axial recess 30 and the transverse opening 31. The opening 31 is closed at its rear by a spring cover plate 81 by screws 82 to secure a bifurcated detent spring 83. The detent spring 83 has a pair of spring arms 83A and 83B which bear against the rear of a pair of adjustment wheels 84 and 85 which extend into axial recess 30 when assembled over and adjusting rod 80 which extends through the hollow piston rod 23.

The thumbwheels 84 and 85 are secured in place on adjusting rod 80 by a pair of clips 90 at the top of rod 80 and clip 91 below the thumbwheel 84. The thumbwheel 85 has a noncircular axial opening 85A, e.g. hexagonal shaped, which attaches the non-circular shape of the top region 80A of the adjusting rod 80. Therefore, rotation of the thumbwheel 85 causes rotation of adjusting rod 80. Thumbwheel 84 includes a circular axial opening 84A corresponding to the circular length of the adjusting rod 80. Rotation of thumbwheel 84 moves adjusting rod 80 linearly. An 0 ring 92 on the adjusting rod 80 seals the adjusting rod 80 to the interior of the piston rod 23 while allowing both rotational and axial movement of the adjusting rod 80 with respect to the piston assembly 24 while maintaining an effective fluid seal with the piston rod 23. One or more shims 93 may be present above the end of the piston rod 23 to select the position of the end of the piston rod 23 with respect to the rod end 22. A locknut 94 is located on the threaded end of the piston rod 23 to engage the underside of the rod end 25 and to secure the piston rod 23 to the rod end 25 during operation.

Referring now specifically to FIG. 3, the lower end of the piston rod 23 may be seen with a side opening 100 and end threads 101 for engaging mating threads in piston 24A of piston assembly 24. Extending into the axial opening of the piston rod 23 is a hat shaped sliding valve member 102 with radial slots 103 in the crown portion of the member 102. The rim 104 of member 102 rests on the lower surface of the piston rod 23 and is super-imposed on a thermally expansive washer 105 for further temperature compensation. The hat shaped member 102 and thermal washer 105 are spring biased toward the piston rod 23 end by a spring 106 via a metal cap protector 110. The spring 106 is secured at its lower end on the adjusting rod 80 by washer 111 and circlip 112.

The piston assembly 24 comprises the piston proper 24A with its 0 ring groove 24B and a one way check valve comprising a retainer ring 24C, return spring 24D and one way washer valving member 24E. This check valve assembly rests in an annular cavity 24F of the piston body 24A with a number, e.g. 16, through passages 24G in the piston body 24A extending between its opposite faces.

A threaded adjustable rebound adjustment threaded collar 113 is in threaded engagement with the axial opening 24H through the piston body 24A and includes a pair of notches 114 for matching with the side openings 100 in the piston rod 23 and a lower slots of collar engage through pin 115 at the lower end of the adjusting rod 80. Rotation of rod 80 through engagement of pin 115 threadably advances the adjustable rebound seat 113 to adjust the preload on the spring 106 and the low speed, e. g. less than 100 psi, rebound characteristics of shock absorber. A locknut 116 and an adjustable calibration stop 120 are in threaded engagement with the lower extension 24I of the piston body 24A completing the piston assembly 24.

OPERATION

In normal operation, the shock absorber is mounted on a vehicle either front or rear. The embodiment of FIGS. 1-3 is designed for use on racing cars and is mounted with the body 15 connected to the vehicle frame and the rod end 25 pivotally secured to a moving portion of the wheel suspension such as the upper control arm in a manner well known in the auto industry. The reservoir 12 is secured to the suspension or frame as by a clip or other fastener sufficiently close to the shock absorber body 21 to allow its normal movement during the most extreme conditions with the pressure hose 13 providing an oil path between the reservoir 12 and the shock absorber 11.

The shock absorber 11 chambers 32 and 33 as well as the chamber 43 of the reservoir 12 are filled with good quality shock absorber fluid such as the ultralight suspension fluid type (UL) produced by the Spectro company of Cucamonga, CA. The bladder 44 chamber 45 filled with nitrogen via the fitting 46 to a pressure in the range of 125 psi to 200 psi, depending upon the desired preload and rod displacement under static conditions. The shock absorber 10 including its reservoir 12 are ready to be mounted on the vehicle with the pressure hose 13 of sufficient length and preferably an internal diameter if 5/16 in. or greater to allow normal unrestricted movement of the end cap 16 without strain on the hose 13. The shock absorber 10 after preliminary adjustments is ready for operation.

PRIMARY ADJUSTMENTS

Figure 11:
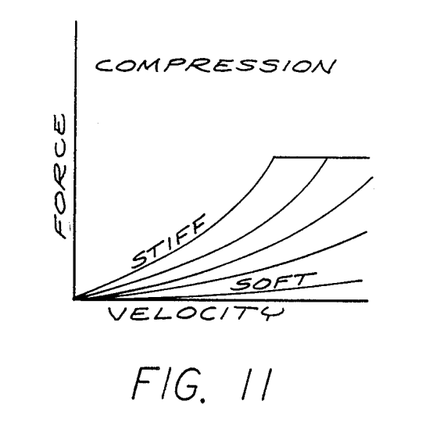

Compression rate adjustment is set by rotation of knob 55 counter-clockwise with left hand threads in FIG. 1 to open aperture 56 to a maximum degree and to provide a soft ride along the lower curve of FIG. 11. As the knob 55 is rotated clockwise, reducing the size of the aperture 56, the compression characteristic becomes stiffer and the force velocity curve rises more rapidly until an internal pressure in chamber 43 reaches preselected level such as 2,000 psi, at which pressure, the pressure relief valve 61 opens and the force remains relatively constant with increasing velocity. The pressure relief valve 70 releases pressure internally into passage 53A which is in communication with the chamber 33 and limits the internal pressure to protect the shock absorber. The normal compression stroke pressure limitation is determined by the pressure relief valve 61 in chamber 45.

The high speed and low speed rebound adjustments each have eight positions per revolution with typically three revolutions over the full range of adjustment. Each position is marked by a recess 84B or 85 B which is useful to receive the end of a 1/16 inch hex wrench of the type found in any mechanic's tool box. The front face of the transverse opening 31 is tapered at each side so that a hex wrench will move approximately 60 degrees and reach a stop while making one incremental change in the rebound characteristics. This provides an effective adjustment system. Detent action is achieved by the presence of the spring arms 83A and B which engage matching grooves 84C and 85C to hold each thumbwheel in fixed position when one adjusted.

Figure 8:
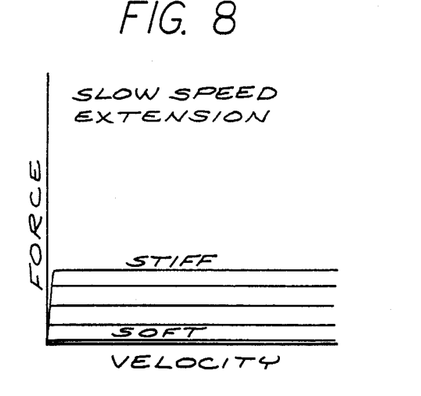
FIGS. 8, 9, 10, 11 and 12 are graphical representations of operating characteristics of shock absorbers incorporating this invention.
Figure 9:
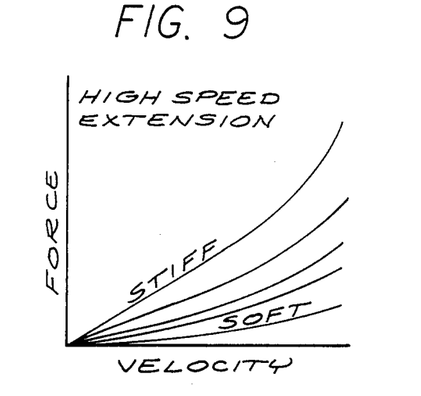

The effects of the high and low speed rebound adjustments by the thumbwheel 84 and 85, respectively, from the operational standpoint of the shock absorber and to the vehicle driver are illustrated graphically in FIGS. 8 and 9.

The slow speed characteristics in FIG. 8 shows a family of curves each with a near instantaneous rise with increases in velocity to a predetermined force level and then remains constant at that force level despite great increases in velocity of the piston movement. The lower curve denotes s soft characteristic and the uppermost curve a stiff suspension. FIG. 9 by way of contrast shows a family of smooth curves from the origin 0 rising toward a vertical asymptote. High speed is denoted as internal pressures of equal or greater than 300 psi while slow speed extension or rebound is considered as equal or less than 100 psi.

Figure 10:
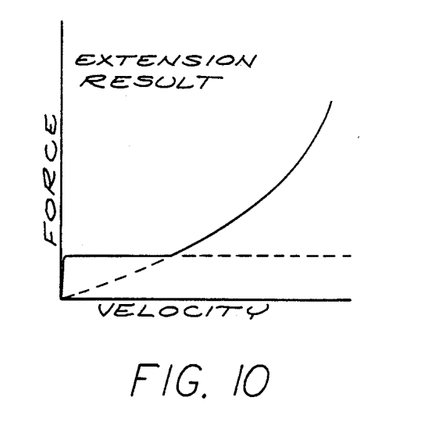

As described above, the two flow restrictors defining the slow speed control and the high speed control are located in series in the rebound flow path so the overall effect of any setting of the slow speed control and the high speed control gives a composite response curve of the type shown in FIG. 10. The rebound characteristics of the shock absorber appears as the composite curve of FIG. 10. The initial rise is controlled by the slow speed adjustment and then overcome by control of the high speed adjustment. This type of rebound characteristic gives a firm stable vehicle at slow piston speeds in contrast with an undesirable "floating" sensation common to vehicles with conventional shock absorbers. At high piston speeds, the high speed characteristics of the shock absorber keeps the vehicle from rising too fast after a strong compression stroke.

The compression characteristic of the shock absorber due to the single adjustment of knob 55 produces a family of smooth curves beginning at the origin 0 and rising to a limit set by the pressure relief valve 70, e. g. 2,000 psi. The compression characteristic curves of FIG. 11 give the following performance advantages as good compliance over slow speed bumps and good resistance over bumps as high speed up to the structural limits of the shock absorber, i. e. above the 2000 psi pressure relief valve capacity.

NORMAL OPERATION

Referring again to FIG. 1, during operation of the vehicle carrying the shock absorber of this invention, the oil contained in the shock absorber 11 and reservoir 12 travels on compression along the path marked by the dashed lines beginning with a C and ending with an arrowhead and a C. The oil of fluid on rebound or extension travels the path marked by the dash-dot lines beginning with an R and ending with an arrowhead and an R.

More precisely, on compression, the piston rod 23 moves upward in FIG. 1, reducing the size of the chamber 33. Fluid in chamber 33 flows through the 16 ports 24G in the piston 2 after overcoming the slight opposing force of the spring 24D to open the washer check valve 24E. The fluid flows freely past the piston 24 into the enlarging chamber 32. Excess fluid also flows out of the shock absorber 11 through the port in fitting 14, through line 13, fitting 15, passages 53, 53A and 53B, through annular aperture 56 and into chamber 43 of reservoir 12. The bladder 44 is compressed providing additional space for the incoming fluid.

At the end of the compression stroke when the pressure in chamber 33 equals that of chamber 32 and 43, the check valve 24E is closed by spring 24D and rebound flow from chamber 32 enters port 100 in piston rod 23, passes up through the central port in piston 23, past the sliding valve member 102, around the thermally expansive washer 105, past spring 106 and out the bottom port of the rebound adjustment threaded collar 113 and into chamber 33. In the reservoir 12, pressure from the compressed gas in the bladder 44 force the fluid in chamber 43 through check valve 70 with its large low resistance port, through port 53A, port 53, fitting 15, line 13 and fitting 14 to the chamber 33. The setting of the compression control 55 has no effect on the rebound flow from the reservoir.

The flow control on rebound is provided by the two series flow restrictors found in the piston rod 23 in the form of the sliding valve 102 and the thermally expansive washer 105. The high speed adjustment described above varies the opening of the multiple orifices in the sliding valve 102 by limiting its travel. The low speed rebound adjustment described above changes the preload of the spring 106 on the pressure relief washer 105.

TEMPERATURE COMPENSATION

Figure 12:
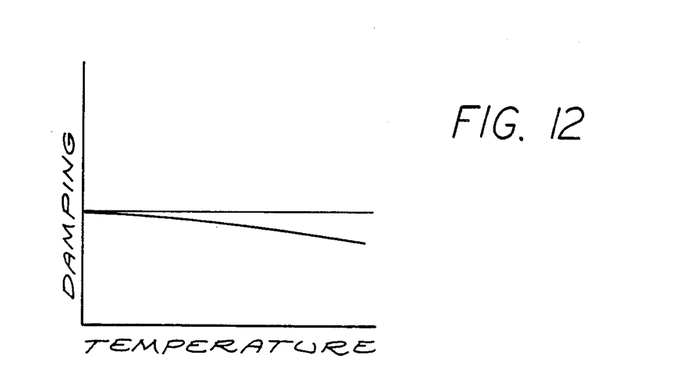

Because of the dramatic changes in temperature to which shock absorbers are subjected in race cars or other performance vehicles, temperature compensation is virtually mandatory for a reliable shock absorber. In this case we have achieved effective temperature compensation through the use of two relatively simple elements in the combination. The two valving members 105 and 56 are located in the rebound and compression flow paths, respectively. Both are formed of the thermally sensitive material Torlon, identified above which exhibits a thermal coefficient of $17 \times 10^{-6}$ in the normal shock absorber operating temperature range of 40 degrees F. to 350 degrees F. This single element in each flow path is sufficient to provide overall temperature compensation for the shock absorber throughout all practical operating conditions. The overall temperature compensation characteristic is illustrated in FIG. 12 in which the damping performance is illustrated as the straight horizontal line representing damping resistance as compared with a typical available un compensated shock absorber in which damping degrades almost linearly from 40 degrees F to 250 degrees F. where it has lost approximately 25% of its damping capability.

CONVENTIONAL VEHICLE SHOCK ABSORBER EMBODIMENTS

The foregoing description relates to a race car shock absorber with three separate independent adjustments, compression, high speed and low speed rebound. Conventional automobiles including performance vehicles do not require such a degree of adjustability and usually are preferred in the coil-over-shock configuration without a separate reservoir. Such are available while employing our invention. The significant differences from the embodiment of FIGS. 1-3 for two such embodiments are illustrated in FIGS. 4 & 5.

Figure 4:
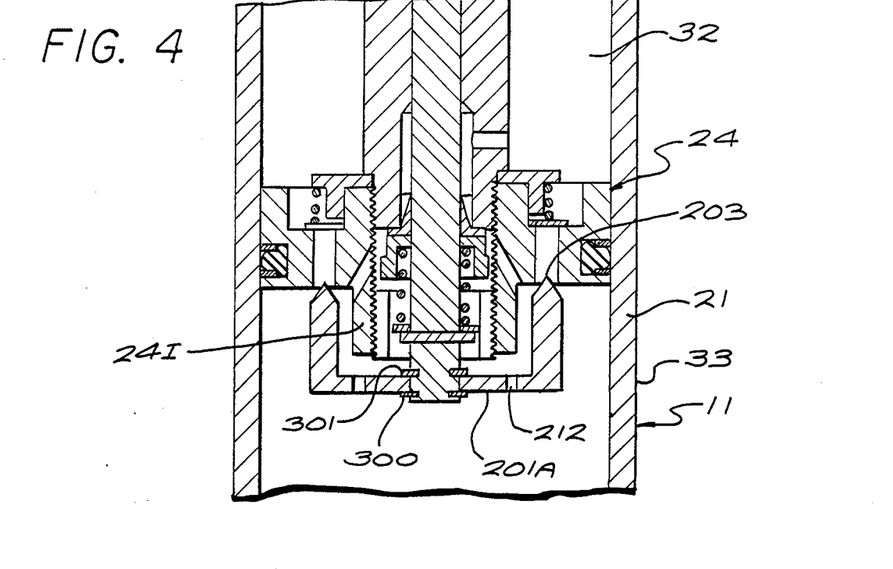
FIG. 4 is a vertical axial sectional view of the piston and portions of the cylinder of an alternate embodiment of this invention.
Figure 5:
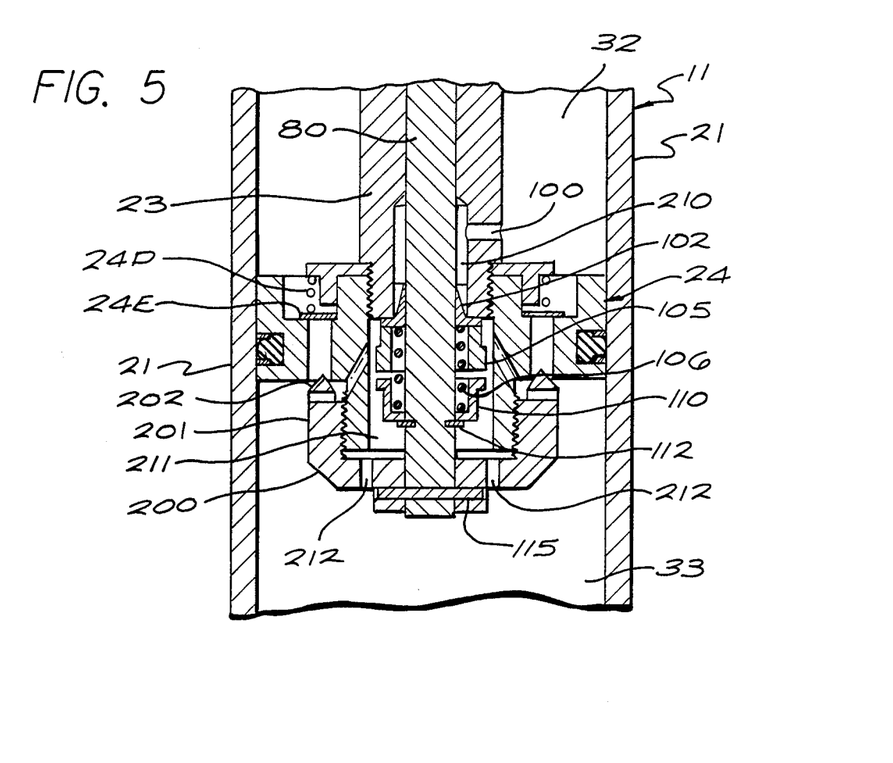
FIG. 5 is a vertical axial sectional view of a second alternate embodiment of this invention.
Figure 6:
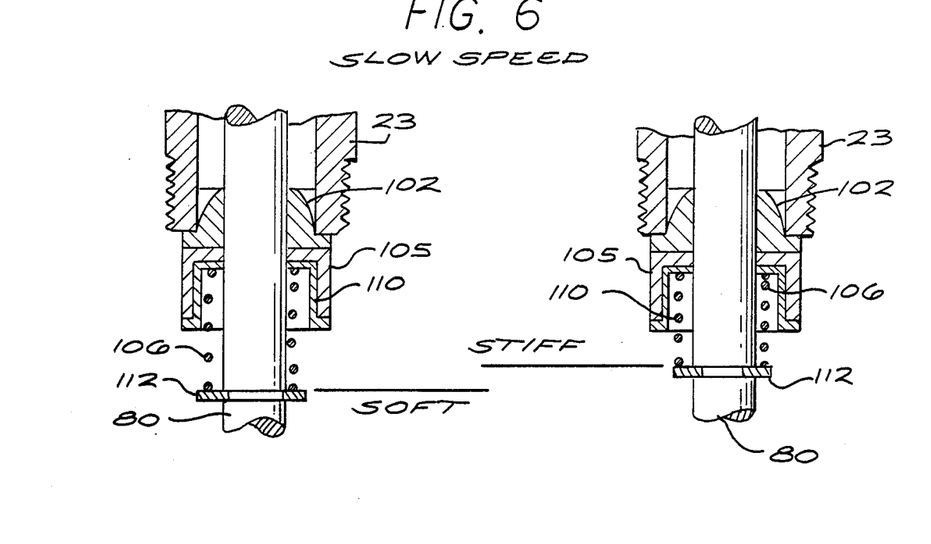
FIG. 6 is a simplified fragmentary axial section through the slow speed rebound adjustment portions of the shock absorber of FIG. 1 taken along lines 6—6 of FIG. 1.
Figure 7:
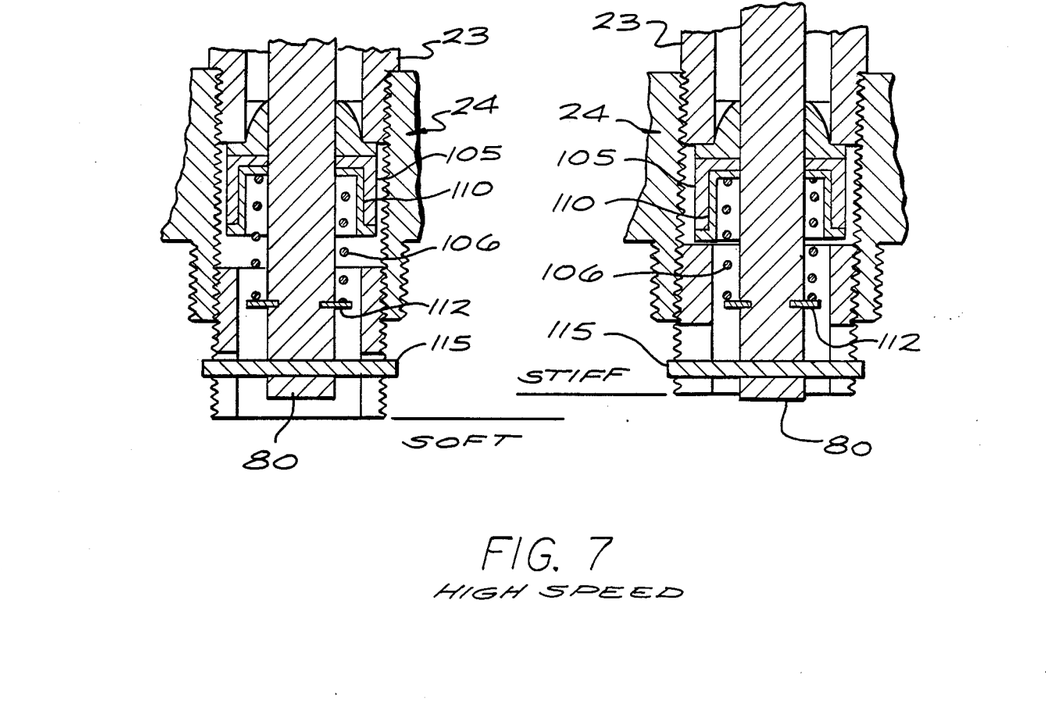
FIG. 7 is a simplified fragmentary axial sectional view of the high speed rebound adjustments of the shock absorber of FIG. 1 taken along lines 7—7 of FIG. 1.

Referring now to FIG. 4, one may see the upper end of the piston rod 23 and its piston 24 located in the shock absorber body 21 with the piston 24 separating the two chambers 32 and 33 as in the embodiment of FIG. 1. The lower or outer portions of the shock absorber 11 are unchanged from FIG. 1 and include the dual adjustment thumbwheels 84 and 85 of FIG. 2 as well as the other features of FIG. 2.

The upper end of the chamber 33 of FIG. 4 is not shown but it can be the same as in FIG. 1 where a separate reservoir is used or may be closed in a self contained shock absorber configuration with a bladder similar to bladder 44 of FIG. 1 contained above the upper limit of piston travel as is conventional in shock absorbers. As another substitution for a separate reservoir, a free piston below the piston 24 may seal a gas chamber within the shock absorber body in accordance with conventional practice in the shock absorber art. Regardless of the choice of a separate reservoir, an internal gas filled bladder or a free piston below the piston 24, the adjusting mechanism of FIG. 4 will serve to provide a dual adjustment shock absorber.

In FIG. 4 most of the same piston and piston valve components as shown in FIG. 1 are used and each such component is given the same designation for clarity. They include the piston 24 with its compression check valve including retainer 24C, spring 24D and valve washer 24E which allows free flow during the compression cycle and blocks flow on rebound. The same sliding valve 102 is used and a similar or identical thermally expandable washer 105, spring 106, protector 110, circlip 112 and cross pin 115.

In this embodiment of FIG. 4, the cross pin 115 rides in a slot 200 of inverted cup shaped valving member 201 with its annular tapered valving surface 202 which is extendable into an annular manifold 203 in piston 24 which communicates with the ports 24G. The annular valving member is threaded on, the extension 24I of the piston 24 so that rotation of the adjusting rod 80 through pin 115 causes the valving member 201 to rotate and advance or return from the opening of the manifold 203. This rotational adjustment of adjusting rod 80 provides a controllable compression rate characteristic for the shock absorber by the rotation of thumbwheel 85 of FIG. 2.

The shock absorber of FIG. 4 is also rebound adjustable by lineal movement of the adjusting rod 80 relative to the piston rod 23. Lineal movement of the rod 80, upward in FIG. 4 increases the size of the several tapered flow paths in the sliding valve 102 allowing controllable rebound flow from chamber 32, through orifice 100, passage 210, past sliding valve 102, through annular passage 211 and out through ports 212 in the valving member 200 into chamber 33.

The compression adjustment and the rebound adjustment of the embodiment of FIG. 4 are both independent of each other since the lineal position of the compression adjusting valving member 200 does not affect the rebound flow path and the lineal position of the sliding valve 105 controlling rebound rate does not affect the compression characteristics.

Another embodiment of this invention is illustrated in FIG. 5 which is a diametrical sectional view of the piston portion of a shock absorber of the type disclosed in FIG. 1. Similar to the embodiment of FIG. 4, a separate reservoir 12 may be used or a bladder or free piston within the chamber 33 beyond piston 24 travel to compensate for the volumetric change in quantity of fluid in chamber 33 on compression. Similar to FIG. 4, as well, the adjusting mechanism and rod end 25 of FIG. 5 are of the type shown in FIGS. 1 and 2. The same elements of the shock absorber in FIG. 5 as in the other figures have the same reference numerals.

In the embodiment of FIG. 5, the compression adjustment is accomplished by lineal movement of the adjusting rod 80 in contrast with FIG. 4. In the FIG. 5 embodiment, the valving member 200A is slightly modified from the form of member 200 of FIG. 4 in that valving member 200A is secured to rod 80 by a pair of circlips 300 and 301 which allow free rotation of the member 200A with no change in linear position. Axial movement of adjusting rod 80, however, produces a movement of its annular valving surface 202 with respect to the annular manifold 203 of piston 24. Rotational movement of adjusting rod 80 does not produce and change in the setting of valving member 200A.

The rebound adjustment elements of the embodiment of FIG. 5 include the rod 80, the piston 24 with its extension 24I into which a threaded bushing 302 is threadably inserted similar to collar 113 of FIG. 3. Pin 115 extends transversely through rod 80 and rides in slot 303. When adjusting rod 80 is rotated, as by thumbwheel 85 of FIG. 2, pin 115 engaging the walls of the slot 303, advances or returns the bushing 302 with the pin 115 bearing on a washer 304 behind spring 106. This adjustment changes the preload on the spring 106 which holds pressure relief valve 305 in a preloaded position and limits the travel of the sliding valve 102 depending upon the pressure. The sliding valve 102 provides high speed adjustment and the pressure relief valve acts as a slow speed control on rebound. In this embodiment, the shock absorber provides adjustable rebound and independent compression adjustment all in a relatively simple structure.

The foregoing constitute the descriptions of the best mode plus alternate embodiments of this invention and are illustrative only of its principle and are not to be considered as limiting. Rather this invention is defined by the following claims including the protection provided by the doctrine of equivalents.

What is claimed is:

1. In a shock absorber including a body defining a cylinder, a piston in the cylinder, a rod for the piston having one end extending out of the cylinder and wherein the shock absorber includes means for securing the body and the end of the piston rod to a vehicle, the improvement in which:
   the piston rod is hollow and the shock absorber includes an adjusting rod extending into the hollow portion of said piston rod and said adjusting rod is longitudinally and rotatably movable with respect to said piston rod;
   wherein the relative positions of the piston and rod combination control flow through at least one restricted flow path between opposite sides of the piston in the cylinder and
   wherein longitudinal relative movement of the adjusting rod with respect to the hollow piston rod makes a first adjustment in the flow in said at least one flow path and relative rotational movement of the adjusting rod with respect to the hollow piston rod makes a second adjustment in the flow in one of the flow paths between opposite sides of the piston.

2. A shock absorber in accordance with claim 1 including means at the outer end of the piston rod for making longitudinal adjustments of the adjusting rod with respect to the hollow piston rod to make the said first adjustment in flow said longitudinal adjustment making means producing substantially no flow adjusting rotational movement in said shock absorber.

3. A shock absorber in accordance with claim 2 wherein said adjustment means includes a first wheel coaxial with said adjusting rod and coupled between said adjusting rod and said hollow piston rod to produce longitudinal movement of said adjusting rod without rotation thereof.

4. A shock absorber in accordance with claim 3 wherein said adjustment means first wheel is in threaded engagement with said hollow piston rod and in longitudinal driving engagement of said adjusting rod.

5. A shock absorber in accordance with claim 1 including means at the outer end of the piston rod for making rotational adjustments of the adjusting rod with respect to the hollow piston rod to make the said second adjustment in flow said rotational adjustment making means producing substantially no flow adjusting longitudinal movement in said shock absorber.

6. A shock absorber in accordance with claim 5 wherein said adjustment means includes a second wheel coaxial with said adjusting rod and coupled between said adjusting rod and said hollow piston rod to produce rotational movement of said adjusting rod without longitudinal movement thereof.

7. A shock absorber in accordance with claim 6 wherein said adjustment means second wheel is in rotationally keyed engagement with said adjusting rod and in threaded engagement with said hollow piston rod.

8. A shock absorber in accordance with claim 1, wherein relative movement of said piston rod and adjusting rod produces said first and second adjustments substantially independent of the flow of fluid in the shock absorber during the rebound stroke of operation of said shock absorber.

9. A shock absorber in accordance with claim 8 wherein at least one of said flow path includes a check valve member which provides a second path for fluid flow in rebound when the fluid pressure exceeds a predetermined level whereby the rebound characteristics of the shock absorber are determined by the two adjustments of said adjusting rod and said check valve.

10. A shock absorber in accordance with claim 1 including a reservoir with means in fluid communication between said reservoir and one side of the piston of the shock absorber;
   said reservoir including flow control means for controlling flow between the reservoir and the shock absorber in a direction opposite the direction of control of flow adjustment employing said adjusting rod.

11. A shock absorber in accordance with claim 1 including at least one rebound flow path and one compression flow path, each of said flow paths including thermally responsive means included in flow paths for independently restricting flow therethrough as the temperature of said thermally responsive means increases.

12. In a shock absorber including a body defining a cylinder, a piston in the cylinder, a rod for the piston having one end extending out of the cylinder and wherein the shock absorber includes means for securing the body and the end of the piston rod to a vehicle, the improvement in which:
   the piston rod is hollow and the shock absorber includes an adjusting rod extending into the piston rod and said adjusting rod is longitudinally and rotatably movable with respect to said piston rod;
   wherein the relative positions of the piston and rod combination control flow through at least one restricted flow path between opposite sides of the piston in the cylinder and
   wherein longitudinal relative movement of the adjusting rod with respect to the hollow piston rod makes a first adjustment in the flow in said at least one flow path and relative rotational movement of the adjusting rod with respect to the hollow piston rod makes a second adjustment in the flow in one of the flow paths between opposite sides of the piston;
   including at least one rebound flow path and one compression flow path, each of said flow paths including thermally responsive means included in at least said one flow path for independently restricting flow therethrough as the temperature of said thermally responsive means increases;
   wherein said thermally responsive means comprises at least one washer encircling said adjusting rod and bearing on flow control elements in the shock absorber to change their flow controlling position as a function of temperature.

13. A shock absorber comprising:
   a body defining a tubular cylinder;
   means closing one end of said cylinder;
   an end fitting for said shock absorber at said end including said closing means;
   a piston axially moveable within said tubular cylinder;
   a hollow piston rod secured to said piston and having one end extending into said cylinder and the opposite end extending out of said cylinder;
   a second end fitting for said shock absorber secured to said opposite end of said hollow piston rod;
   said piston having a pair of opposite faces and including at least one fluid flow passage for allowing fluid communication between opposite faces;
   means sealing said piston rod to said cylinder;
   whereby said cylinder end fitting and said piston define one variable volume chamber within said cylinder and said cylinder, piston and said piston rod sealing means defines a second variable volume chamber within said chamber;
   an adjusting rod within said hollow piston rod and extending from said piston region to said opposite end region of said hollow piston rod;
   means secured to said adjusting rod and responsive to longitudinal movement of said adjusting rod for changing the flow restriction characteristics of said fluid flow passage;
   means secured to said adjusting rod and responsive to rotational movement of said adjusting rod for changing the flow characteristics of said fluid flow passage;
   first means external to said cylinder for selectively moving said adjusting rod longitudinally to effect a change in said flow characteristics; and
   said means external to said cylinder for selectively rotating said adjusting rod to effect a different change in the flow characteristics of said flow characteristics.

14. A shock absorber in accordance with claim 13 wherein said first adjusting rod moving means is in threaded engagement with said hollow piston rod whereby rotational adjustment of said first adjusting rod means produces relative longitudinal movement of said adjusting rod.

15. A shock absorber in accordance with claim 13 wherein said second adjusting rod moving means is in longitudinally sliding keyed relationship with said adjusting rod for allowing longitudinal movement of said adjusting rod while preventing rotational movement of said adjusting rod during movement of said first adjusting rod moving means.

16. A shock absorber in accordance with claim 15, wherein said keyed relationship includes a non-circular section of said adjusting rod and a matching non-circular section of said second adjusting rod moving means wherein said non-circular section and said matching non-circular section extend parallel to the axis of said cylinder.

17. A shock absorber in accordance with claim 8 wherein said non-circular sections are multi-sided.

18. A shock absorber comprising: a body defining a tubular cylinder; means closing one end of said cylinder;
   an end fitting for said shock absorber at said end including said closing means;
   a piston axially moveable within said tubular cylinder;
   a hollow piston rod secured to said piston and having one end extending into said cylinder and the opposite end extending out of said cylinder;
   a second end fitting for said shock absorber secured to said opposite end of said hollow piston rod;
   said piston having a pair of opposite faces and including at least one fluid flow passage for allowing fluid communication between opposite faces;
   means sealing said piston rod to said cylinder;
   whereby said cylinder end fitting and said piston define one variable volume chamber within said cylinder and said cylinder, piston and said piston rod sealing means defines a second variable volume chamber within said chamber;
   an adjusting rod within said hollow piston rod and extending from said piston region to said opposite end region of said hollow piston rod;

means secured to said adjusting rod and responsive to longitudinal movement of said adjusting rod for changing the flow restriction characteristics of said fluid flow passage;

means secured to said adjusting rod and responsive to rotational movement of said adjusting rod for changing the flow characteristics of said fluid flow passage;

first means external to said cylinder for selectively moving said adjusting rod longitudinally to effect a change in said flow characteristics; and second means external to said cylinder for selectively rotating said adjusting rod to effect a different change in the flow characteristics of said flow characteristics;

wherein said flow passage includes a pair of variable flow restrictors in series in the flow path between opposite sides of said piston whereby the operating characteristics of said shock absorber is a function of the combined effects of said flow restrictors with one of said flow restrictors being varied by rotation of said adjusting rod and the other of said flow restrictors being varied by longitudinal movement of said adjusting rod.

19. A shock absorber in accordance with claim 18 wherein said flow restrictors are in the rebound flow path of the shock absorber.

20. A shock absorber in accordance with claim 19 including means for variably controlling the flow of fluid in the compression flow path.

21. A shock absorber in accordance with claim 19 including a separate reservoir for fluid within said shock absorber and including conduit means communicating between said shock absorber and said reservoir and wherein said compression flow path controlling means is located at said reservoir.

* * * * *